United States Patent

[11] 3,619,001

| [72] | Inventor | Charles L. Borskey<br>P.O. Box 26, Andrews, Ind. 46702 |
|---|---|---|
| [21] | Appl. No. | 20,545 |
| [22] | Filed | Mar. 18, 1970 |
| [45] | Patented | Nov. 9, 1971 |

[54] VEHICLE WITH RETRACTABLE AND EXTENSIBLE ROOF ASSEMBLY
4 Claims, 4 Drawing Figs.

| [52] | U.S. Cl. | 296/137 B, 296/26 |
|---|---|---|
| [51] | Int. Cl. | B60j 7/10 |
| [50] | Field of Search | 296/137 B, 137 R, 27, 26, 23 R, 23 MC |

[56] References Cited
UNITED STATES PATENTS

| 2,963,313 | 12/1960 | Bennett | 296/26 |
|---|---|---|---|
| 3,212,812 | 10/1965 | Kurtz | 296/137 B |
| 3,053,562 | 9/1962 | Farber | 296/26 |

Primary Examiner—Benjamin Hersh
Assistant Examiner—Robert R. Song
Attorney—Wilson & Fraser

ABSTRACT: A vehicle with a retractable and extensible roof assembly comprising a ceiling for the vehicle having an opening formed at one end thereof, a vertically movable roof portion over the ceiling, movable between a fully extended portion and a retractable portion having flexible sidewalls between the movable roof portion in the ceiling, and spring biased means for aiding in the elevation of the roof to the fully extended position thereof.

INVENTOR.
CHARLES L. BORSKEY

BY Wilson + Fraser

ATTORNEYS

INVENTOR.
CHARLES L. BORSKEY
BY Wilson + Fraser
ATTORNEYS 3,619,001

VEHICLE WITH RETRACTABLE AND EXTENSIBLE ROOF ASSEMBLY

DESCRIPTION OF THE PRIOR ART

In recent years, small buses and vans and similar vehicles have become extensively used, often by families and small groups, in traveling from one part of the country to another, using the vehicle for living quarters at night and during stopovers at vacation and recreation places. These small buses and vans are not sufficiently tall to permit an adult to stand erect or to move comfortably from place to place in the vehicle. Various attempts have been made to make extensible roofs for these vehicles, but the structures resulting from these attempts have been mostly unsatisfactory in that they are often difficult to extend and retract and/or do not become effectively sealed in watertight relationship when folded or retracted. Further, since the extensible and retractable portions are rarely made and installed as part of the original vehicle structure, the units previously used have generally been difficult to install without making substantial changes in the overall top structure of the vehicle.

SUMMARY

It is one of the principle object of the present invention to provide an extensible and retractable roof for a vehicle which can be readily installed on a conventional vehicle after it has left the manufacturing plant and can be easily operated or manipulated between fold and unfolded positions without the use of any special tools or equipment.

Another object of the invention is to provide an extensible roof for a vehicle which encloses substantially all of the principle moving parts within the top thereof, and which effectively seals itself in a folded position to prevent water, dirt, grit, and other foreign materials from entering the extensible roof portion of the vehicle.

Still another object of the invention is to provide a compact, relatively simple vehicle extensible roof structure which, when in folded position, increases the height of the vehicle very little and is compatible with the lines and design of the overall vehicle and which, when in extended position, can be installed without substantially weakening or altering the structure of the original vehicle top.

A further object of the invention is to provide an extensible roof structure of the aforementioned type which provides adequate room in the vehicle for an adult individual to stand erect and sufficient height in the vehicle to enable the space to be used for storage or as sleeping space when it is in its extended position.

Another object of the invention is to provide an extensible roof which can be fully manufactured apart from the vehicle and shipped, stored and installed without the use of any special tools, equipment, or special skill, and which can be readily constructed using standard, readily available materials.

BRIEF DESCRIPTION OF THE DRAWINGS

Other objects and advantages of the invention will become readily apparent to those skilled in the art from reading the following detailed description of an embodiment of the invention when considered in the light of the accompanying drawings, in which.

DESCRIPTION OF PREFERRED EMBODIMENT

Figure 1:
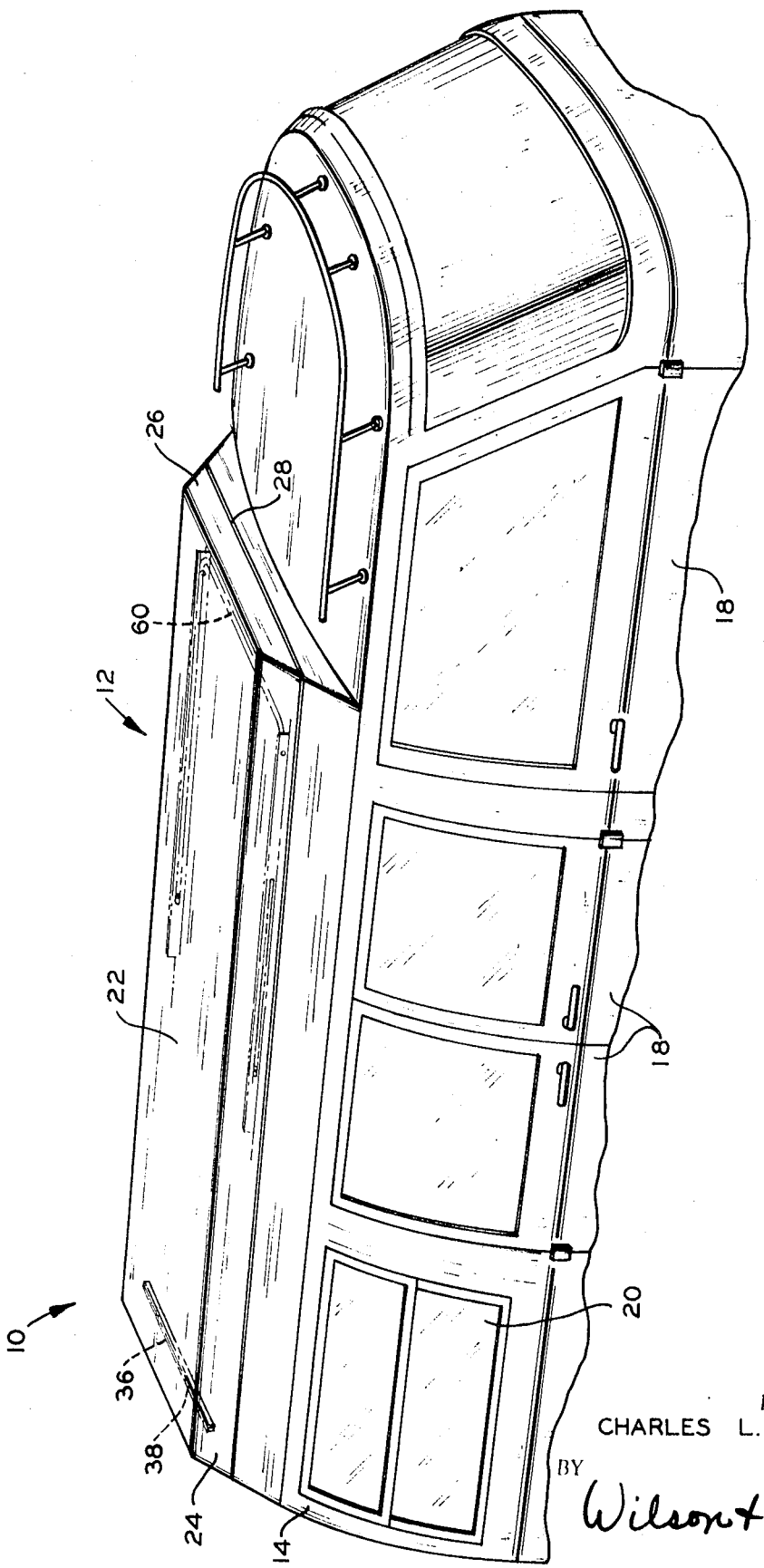
FIG. 1 is a fragmentary perspective view of a vehicle showing the retractable and extensible roof assembly of the invention in a retracted position.
Figure 2:
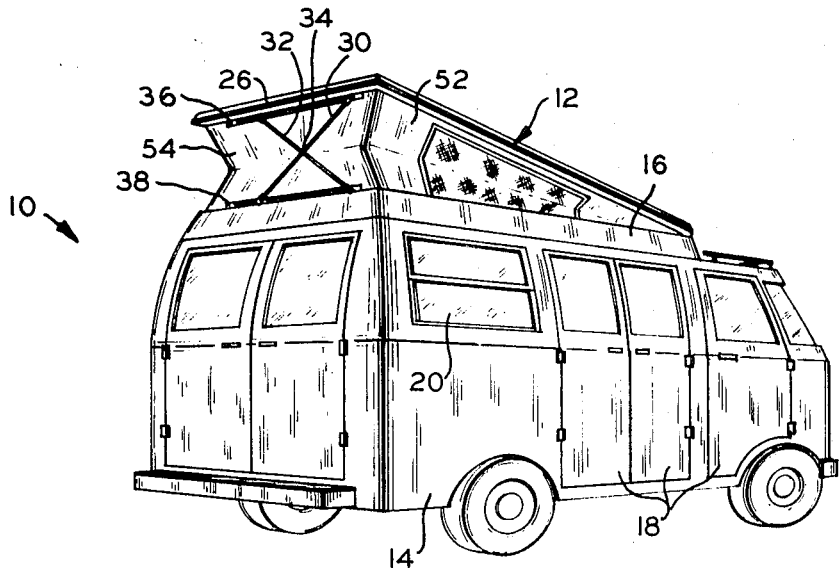
FIG. 2 is a fragmentary perspective view of the vehicle illustrated in FIG. 1 showing the rear end of the roof assembly in the raised position.

Referring to the drawings and to FIGS. 1 and 2 in particular, there is shown a vehicle generally designated by reference numeral 10, on which a retractable or extensible roof 12 is mounted. The vehicle illustrated in the drawings is a small bus or van which typically does not have sufficient height between the floor and the ceiling for an adult to stand erect therein. The roof 12 is typically formed of a fiber glass reinforced plastic material which is light in weight, sturdy in construction, resistant to weather, and easy to maintain. The contour of the roof 12 when it is in the retracted or lower position, as illustrated in FIG. 1, presents a low silhouette which is pleasing in appearance and is of acceptable aerodynamic configuration. The type of vehicle on which the roof installation is made is not considered critical so long as the vehicle top construction is such that the present retractable and extensible roof can be mounted thereon. However, it should be noted that the roof of the present invention is particularly adapted to small vehicles which require additional head room for passengers or occupants. These vehicles generally include a body portion 14, a ceiling portion 16, doors 18, a plurality of windows 20, and front and rear ground engaging wheels, not shown.

The retractable and extensible roof 12 consists of a top panel 22, curved side panels 24, and end panels 26. At the free marginal edges of the side and end panels 24 and 26, respectively, there is provided a molding strip 28, typically formed of an elastomeric material such as rubber, for example, which will effectively create a cushioned seal between the roof 12 and the ceiling portion 16 of the vehicle 10. It will be appreciated that, in the position illustrated in FIG. 1, the seal 28 effectively militates against the passage into the interior of the top 12 of water, dirt, grit, and other foreign materials.

Figure 3:
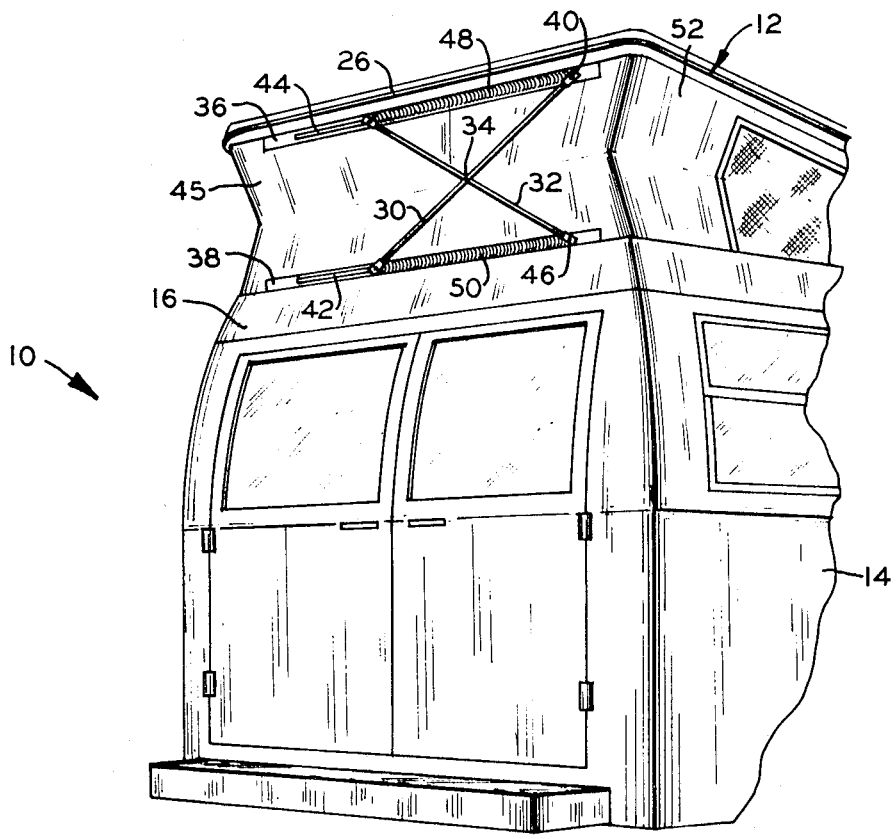
FIG. 3 is an enlarged fragmentary perspective view of the structure illustrated in FIG. 2 to more clearly illustrate the structure.

In order to assist the raising of the roof 12 from the retracted position of FIG. 1 to the partially extended position of FIGS. 2 and 3, there is provided a mechanism which includes a pair of crossarms 30 and 32, having their center portions pivotally interconnected as at 34. The opposite ends of the crossarms 30 and 32 are connected to channel members 36 and 38 fixedly engaged to the ceiling portion 16 of the vehicle 10 and the rearmost innersides of the end panel 26. The upper end of the crossarm 30 is pivotally engaged to one end of the channel member 36, as at 40, while the opposite or lower end thereof is slidably engaged in a slot 42 of the channel member 38. The upper end of the crossarm 32 is slidably engaged in a slot 44 of the channel member 36, while the opposite or lower end thereof is pivotally engaged to the forward end of the channel member 38 as at 46. A helical spring means 48 has one end thereof secured to the channel member 36 and the opposite end secured to the upper end of the cross arm 32. A similar helical spring means 50 has one end thereof secured to the channel member 38 and the opposite end secured to the lower end of the crossarm 30. When the roof 12 is in the lower retracted position of FIG. 1, the spring means 48 and 50 are in tension and manifestly will aid in the elevation of the roof 12 to the extended position illustrated FIG. 2. It will be understood that the combined strength of the spring means 48 and 50 is sufficient to aid in elevating the rear portion of the roof 12. In order to effect an elevation of the rear of the roof 12, the roof 12 must be manually manipulated to effect the desired elevation. Upon reaching the full uppermost extended position of the roof 12, the ends of the crossarms 30 and 32 in the slots 42 and 44, respectively, fall into suitable notches therein. When the ends of the crossarms 30 and 32 fall into the notches in the ends of the slots 42 and 44 of the channel members 36 and 38, respectively, the roof is retained in the fully extended position. It will be manifest that in order to return the roof to the lower retracted position, the ends of the crossarms 30 and 32 must be manually removed from the notches in the ends of the slots 42 and 44 of the channel members 36 and 38, respectively.

As illustrated in FIGS. 2 and 3, when the roof 12 is in the extended position, side and end flaps 52 and 54 are unfolded and effectively enclose the space between the undersurface of the roof 12 and the upper surface of the ceiling 16 of the vehicle 10. The side and end flaps 52 and 54 are comprised of flexible water repellent material such as canvas, for example, and may have openings therein covered by a flexible screening material to permit the transmission of both air and light therethrough. The upper marginal edges of the side and end flaps 52 and 54 are typically secured to the inner surface of the roof 12 and the lower edges are suitably secured to the upper surface of the ceiling 16 of the vehicle 10. Thereby, when the roof 12 is lowered to its retracted position, the flexible material of the side and end flaps 52 and 54 fold to a concealed position under the roof 12.

Figure 4:
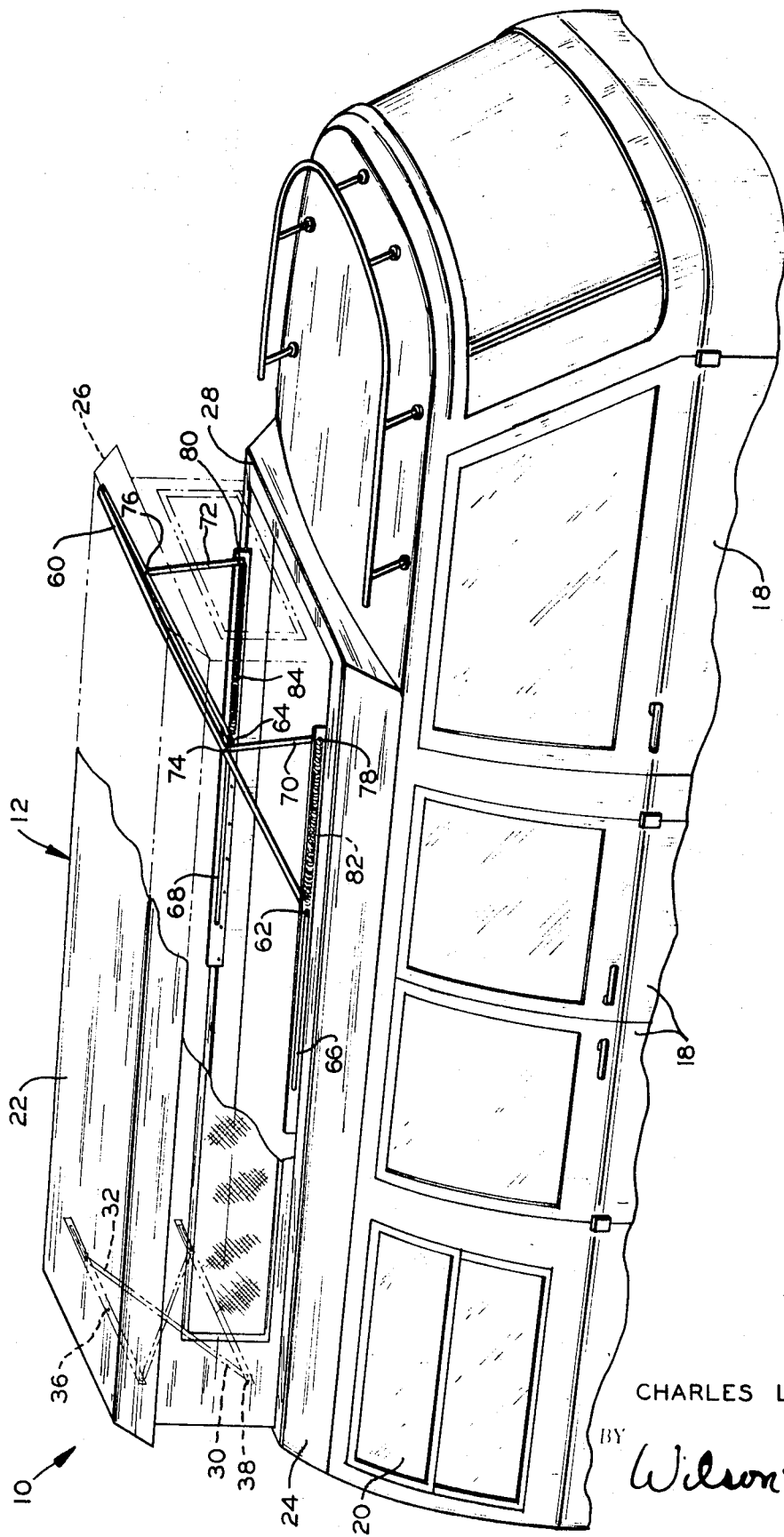
FIG. 4 is a fragmentary perspective view of the vehicle shown in FIGS. 1, 2, and 3 showing the roof assembly in the raised or extended position.

FIG. 4 illustrates the final elevating step of the roof 12, wherein the front portion of the roof is raised to its fully extended position and maintained in such position by a supporting mechanism including an inverted, generally U-shaped bow member 60. The free ends 62 and 64 of the bow member 60 are slidably engaged in suitable guiding channel members 66 and 68 such that the free ends thereof may slide along a generally horizontal path.

Cooperating with the bow member 60 are linkages 70 and 72 having one of their terminal portions pivotally connected as at 74 and 76 to respective depending leg portions of the bow member 60 and the opposite ends thereof pivotally connected to the channels 66 and 68, as at 78 and 80, respectively. It will be appreciated that the pivot points 74 and 76 are generally at a midpoint between the free ends of the bow member and the portion of the major curve therein.

Between the free ends of the bow member 60 and the pivot points 78 and 80 of the associated linkages 70 and 72, there is disposed helical spring members 82 and 84 which effectively aid in the elevating of the assembly to its final raised position. It will be appreciated that, in the lowered position, the springs will be under considerable tension which will be relieved upon the elevating of the roof structure to its final position as shown in FIG. 4.

Suitable notches may be provided in the channel members 66 and 68 into which the guide members on the free ends 62 and 64 of the bow member 60 will rest when the roof is in its fully raised position. Such notches are effective to positively assure that the roof 12 will remain in the raised position until it is desired to lower the same.

While not specifically illustrated, it will be appreciated that on the interior portion of the roof 12 there are disposed handle elements which will provide means which can readily be grasped by an operator to aid in the elevating and/or lowering of the roof 12.

The extensible roof 12 is typically installed on a conventional small bus or van type vehicle by cutting an aperture or hole in the ceiling portion of the vehicle of the desired size. The marginal edges of the so formed aperture may then be covered by appropriate molding strips to provide a finished appearance thereto. Then the channel members 66 and 68 are suitably secured to the undersurface of the roof 12 and the upper surface of the ceiling portion 16, respectively. When the channel members 66 and 68 are secured in place, it would be understood that the bow member 60 and the associated linkages 70 and 72 are simultaneously positioned. It will be apparent that the installation is made by the utilization of conventional fastener means such as screws or nuts and bolts, and that no special tools are required. After the extensible roof surface has been installed on the vehicle 10, the roof 12 can be conveniently extended from the inside of the vehicle by initially merely applying an upward force to the rear portion of the under surface of the roof 12. As the roof 12 is lifted, the side and end flap members 52 and 54 are brought under some tension until they are completely unfolded from their normally folded position when the roof is in a retracted position. After the rear portion of the roof 12 has been lifted to its fully extended position, it is locked in this position by the ends of the crossarms 30 and 32 being positioned in respective notches of the slots 42 and 44. Next, an upward force is suitably applied to the front portion of the roof 12 which effectively causes the bow member 60 to tend to assume the position illustrated in FIG. 4. During the upward travel of the front portion of the roof 12, the terminal ends of the bow member 60 are guided forwardly in the respective channel members 66 and 68 until the ends are in the position illustrated in FIG. 4.

When it is desired to retract the roof 12, the ends of the terminal portions of the bow member 60 are removed from the notches in the ends of the slots in the guide channel members 66 and 68 and the weight of the front portion of the roof is typically sufficient to allow the entire front portion of the roof to return with slight pressure to work against the force of the spring members 82 and 84 to allow the front portion of the roof to return to its retracted position. Then, the ends of the crossarms 30 and 32 are removed from the notches in the ends of the slots 42 and 44, respectively, and the weight of the rear portion of the roof is then typically sufficient to return the entire structure to the retracted position. As the roof 12 is moved to its final retracted position, the side and end flaps 52 and 54 are folded to be completely concealed within the interior of the roof in a protected position.

While mention has been made in the foregoing description of the employment of notches for retention of the linkage members of the respective systems for the front and rear portions of the roof, it will be understood that the notches are not deemed necessary. The bias of the respective spring elements and/or the weight of the roof structure will cooperate to retain the linkages in the desired positions.

In accordance with the provisions of the patent statutes, I have explained the principle and mode of operation of my invention and have illustrated and described what I now consider to represent its best embodiment. However, it is to be understood that, within the spirit and scope of the appended claims, the invention may be practiced otherwise than as specifically illustrated and described.

What I claim is:

1. A vehicle having a passenger compartment and a retractable roof assembly including a ceiling structure for the vehicle having an aperture formed therein providing communication with the passenger compartment of the vehicle, and a roof disposed in superposed relation over said ceiling structure and covering the aperture in said ceiling structure, the improvements comprising:
    means for selectively extending and retracting said roof structure, said means including means for extending and retracting the front and rear portions of said roof independently of one another, at least one of said means for selectively extending and retracting said roof includes a first supporting member extending between said roof and said ceiling structure, said first supporting member having its upper end portion in load bearing relation with said roof and its lower portion disposed for guided horizontal movement along said ceiling structure; and a second supporting member extending between said first supporting member and said ceiling structure, said second supporting member having one end portion pivotally connected to said first supporting member at a distance from said lower portion there of and the other end pivotally connected to said ceiling structure.

2. The invention claimed in claim 1 including guide means attached to said ceiling structure for guiding the lower portion of said first supporting member.

3. The invention defined in claim 2 wherein said first supporting member is an inverted bow member.

4. The invention defined in claim 1 including biassing means for assisting the extension of said roof to its fully extended position.

* * * * *